(12) United States Patent
Gatto

(10) Patent No.: US 10,216,357 B2
(45) Date of Patent: Feb. 26, 2019

(54) APPARATUS AND METHOD FOR CONTROLLING THE APPARATUS

(71) Applicant: SONY CORPORATION, Tokyo (JP)

(72) Inventor: Alexander Gatto, Stuttgart (DE)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/320,401

(22) PCT Filed: Jul. 16, 2015

(86) PCT No.: PCT/EP2015/066293
§ 371 (c)(1),
(2) Date: Dec. 20, 2016

(87) PCT Pub. No.: WO2016/008988
PCT Pub. Date: Jan. 21, 2016

(65) Prior Publication Data
US 2017/0293412 A1    Oct. 12, 2017

(30) Foreign Application Priority Data
Jul. 16, 2014  (EP) .................................. 14177248

(51) Int. Cl.
*G06F 3/0481* (2013.01)
*G06F 3/01* (2006.01)
*G06F 3/03* (2006.01)
*G02B 27/01* (2006.01)

(52) U.S. Cl.
CPC ....... *G06F 3/04815* (2013.01); *G02B 27/017* (2013.01); *G06F 3/011* (2013.01); *G06F 3/017* (2013.01); *G06F 3/0304* (2013.01); *G02B 2027/0187* (2013.01)

(58) Field of Classification Search
None
See application file for complete search history.

(56) References Cited

U.S. PATENT DOCUMENTS

| 2011/0140994 A1 | 6/2011 | Noma |
| 2012/0200495 A1 | 8/2012 | Johansson |
| 2012/0206335 A1 | 8/2012 | Osterhout et al. |

(Continued)

FOREIGN PATENT DOCUMENTS

CN    103440036 A    12/2013

OTHER PUBLICATIONS

Michael Van Den Bergh, et al., "Perceptive User Interface, A Generic Approach," International Conference on Computer Vision in Human-Computer Interaction, 2005, www.mvdblive.org/research/eth_biwi_00434.pdf, (10 pages).

(Continued)

*Primary Examiner* — Kenneth B Lee, Jr.
(74) *Attorney, Agent, or Firm* — Xsensus LLP

(57) ABSTRACT

An apparatus including a processor configured to: obtain image data representing an object for being displayed to a user, wherein the object is displayed on the basis of left eye image data and right eye image data obtained on the basis of the image data; obtain user eye position data representing a left pupil position and a right pupil position of the user; and generate a left eye image position for the left eye image data and a right eye image position for the right eye image data on the basis of the user eye position data.

20 Claims, 8 Drawing Sheets

(56) References Cited

U.S. PATENT DOCUMENTS

| | | | |
|---|---|---|---|
| 2012/0206444 A1 | 8/2012 | Takahashi et al. | |
| 2013/0246967 A1* | 9/2013 | Wheeler | G06F 3/012 715/784 |
| 2013/0321271 A1 | 12/2013 | Bychkov et al. | |
| 2014/0033052 A1 | 1/2014 | Kaufman et al. | |
| 2014/0152558 A1* | 6/2014 | Salter | G06F 3/013 345/157 |
| 2014/0191946 A1* | 7/2014 | Cho | G02B 27/017 345/156 |

OTHER PUBLICATIONS

International Search Report dated Oct. 16, 2015 in PCT/EP2015/066293 filed Jul. 16, 2015.
Office Action issued in European Application 15 741 148.9-1216 dated Jul. 4, 2018.

* cited by examiner

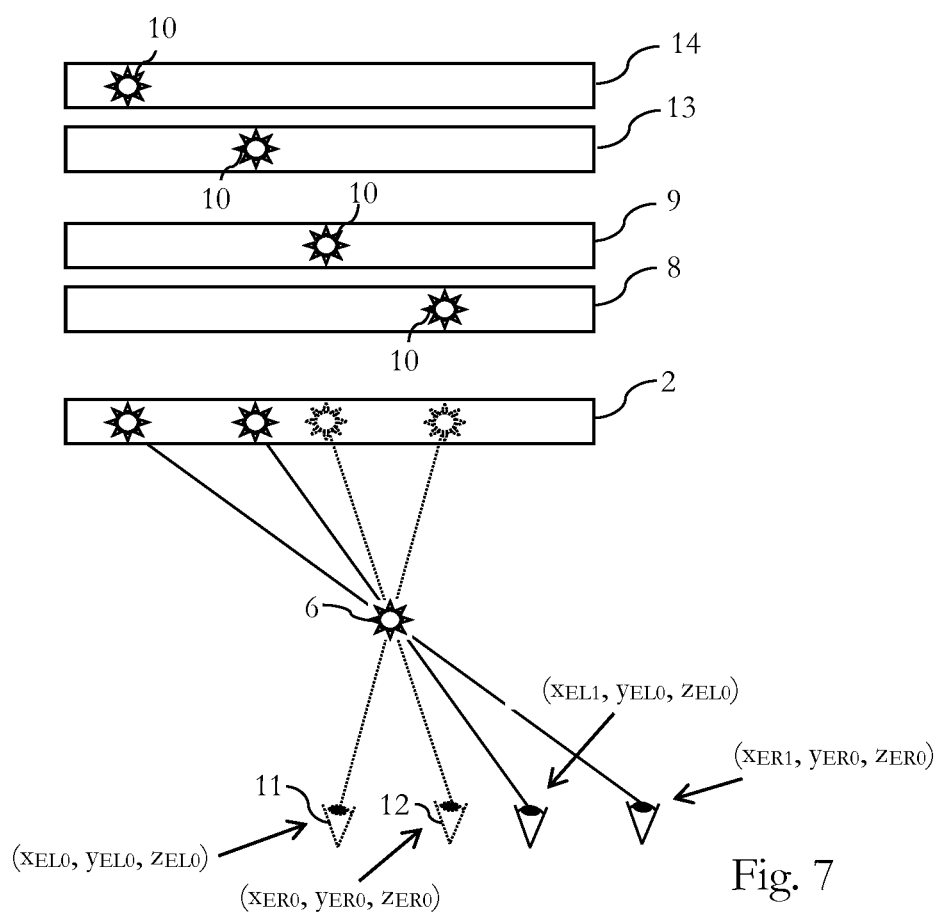

APPARATUS AND METHOD FOR CONTROLLING THE APPARATUS

CROSS-REFERENCE TO RELATED APPLICATIONS

The present application is based on PCT filing PCT/EP2015/066293 filed Jul. 16, 2015, and claims priority to European Patent Application 14177248.3 filed by the European Patent Office on 16 Jul. 2014, the entire contents of each of which being incorporated herein by reference.

TECHNICAL FIELD

The present disclosure generally pertains to an apparatus and a method for controlling the apparatus.

TECHNICAL BACKGROUND

Generally, it is known, that a user may interact with an electronic apparatus, such as a computer or a mobile device, by using a pointing device, e.g. a "mouse". The user guides the mouse with his hand in a two-dimensional plane and the motion of the mouse results in motion of a virtual cursor on a two-dimensional display. A similar kind of interaction can be accomplished with a touchpad or with a joystick.

Another possibility for an interaction of a user with an electronic apparatus is provided by a touch display. In case of a touch display, a user's finger is moved in the plane in which the object of interest is situated.

These kinds of interaction are typically restricted to a two-dimensional world.

Although there exist techniques for interacting with an (electronic) apparatus, it is generally desirable to improve the interaction with an (electronic) apparatus.

SUMMARY

According to a first aspect, the disclosure provides an apparatus including a processor configured to obtain image data representing an object for being displayed to a user, wherein the object is displayed on the basis of left eye image data and right eye image data obtained on the basis of the image data, to obtain user eye position data representing a left pupil position and a right pupil position of the user, and to generate a left eye image position for the left eye image data and a right eye image position for the right eye image data on the basis of the user eye position data.

According to a second aspect, the disclosure provides a method including obtaining image data representing an object for being displayed to a user, wherein the object is displayed on the basis of left eye image data and right eye image data obtained on the basis of the image data, obtaining user eye position data representing a left pupil position and a right pupil position of the user, and generating a left eye image position for the left eye image data and a right eye image position for the right eye image data on the basis of the user eye position data.

Further aspects are set forth in the dependent claims, the following description and the drawings.

BRIEF DESCRIPTION OF THE DRAWINGS

Embodiments are explained by way of example with respect to the accompanying drawings, in which:

FIG. 7 schematically illustrates the left and right eye image position and the fixed object perception position of the displayed object according to an embodiment, when the user moves in parallel to the displaying plane;

DETAILED DESCRIPTION OF EMBODIMENTS

Figure 1:
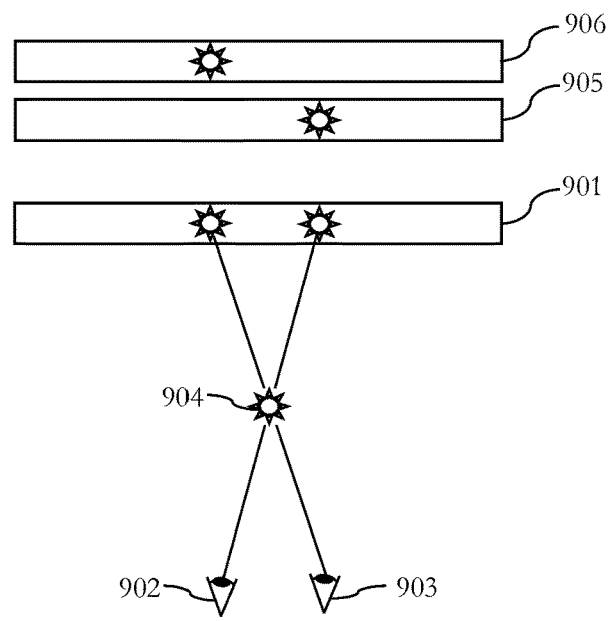
FIG. 1 schematically illustrates an object perception position of a displayed object perceived by a user.

Before a detailed description of the embodiments under reference of FIGS. 5 to 13, general explanations are made.

As described above, typical user interfaces, such as a mouse or a touch display are restricted to a two-dimensional plane. However, in some embodiments, it is desired to interact with electronic devices like PCs or mobile devices or any other kind of devices which require human interaction via virtual objects presented by a three dimensional display, such as a stereoscopic display, in the three-dimensional space as humans do it in daily life with real objects. For this purpose, it was recognized that it can be desired that a user perceives a virtual object in the three dimensional space used for the interaction, which stays at a fixed object perception position in front of the stereoscopic display independent from movements of a user's head.

In the following a more detailed description of the general perception of an (virtual) object displayed by a three dimensional display, e.g. a stereoscopic display 901, is given with reference to FIGS. 1 to 4. As presented by FIG. 1, a user directing his eyes, i.e. left eye 902 and right eye 903, towards the stereoscopic display 901 has the impression that a virtual object 904 is arranged in the three dimensional space in front of the stereoscopic device 901 and, thus, in front of the user. To create such an impression, the stereoscopic display 901 requires two images, a left eye image 905 for a user's left eye 902 and a right eye image 906 for the user's right eye 903, both including a picture (image) of the object 904. The position of the object 904 perceived by the user in front of the display 901 depends on the spatial distance of the object 904 between the left eye image 905 and the right eye image 906.

The larger the distance is between the picture of the object 904 represented by the left eye image 905 and the picture of the object 904 represented by the right eye image 906, the closer is the object 904 perceived by the user and, vice versa, the smaller the distance is between the picture of the object 904 represented by the left eye image 905 and the picture of the object 904 represented by the right eye image 906, the farer away is the object 904 perceived by the user (i.e. closer to the stereoscopic display 901).

Figure 2:
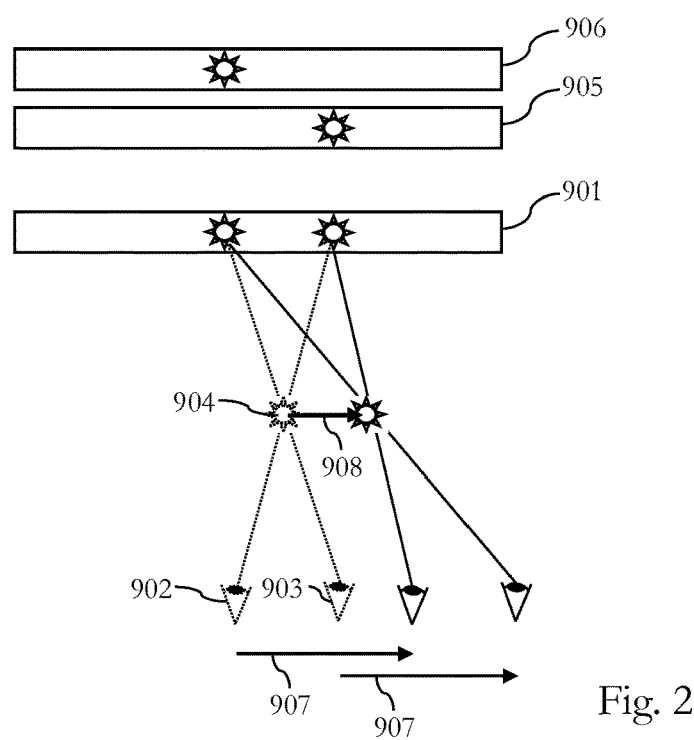
FIG. 2 schematically illustrates the object perception position of the displayed object perceived by the user having moved parallel to a displaying plane.

If the left eye image 905 and the right eye image 906 are static, the virtual object 904 moves with a user's movements. If a user is moving e.g. parallel to a displaying plane of the stereoscopic display 901 without changing his distance to the stereoscopic display, as indicated in FIG. 2 by arrow 907, a movement as indicated by arrow 908 of the virtual object 904 is observed, i.e. if the user moves to the right, also the object 904 is perceived as moving to the right, and vice versa. This is caused by a parallax of the user relative to the static left eye image 905 and the static right eye image 906 shown on the stereoscopic display 901.

Figure 3:
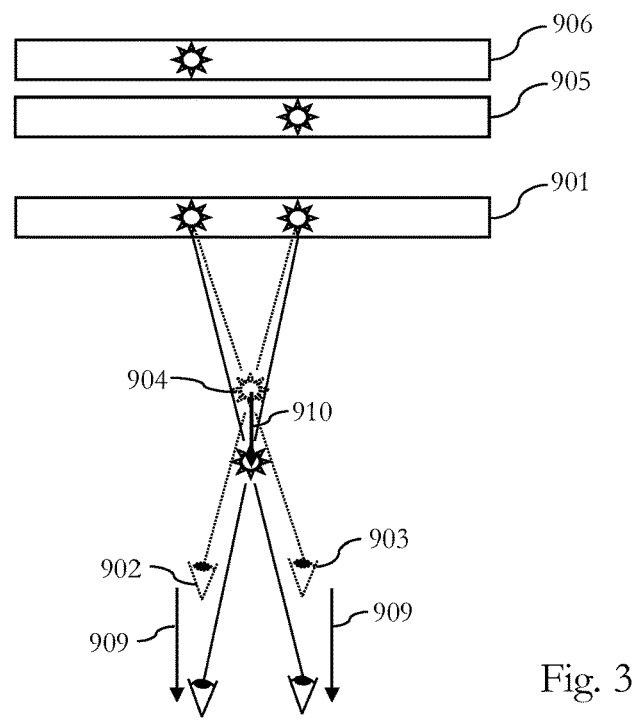
FIG. 3 schematically illustrates the object perception position of the displayed object perceived by the user having moved away from the displaying plane.

A movement of the virtual object 904 is also observed by the user for a static left eye image 905 and a static right eye image 906 if the user, i.e. the user's eyes 902 and 903, changes its relative distance to the stereoscopic display 901. If the user moves away from the stereoscopic display 901 and, thus, increases the distance to the stereoscopic display 901, as indicated in FIG. 3 by arrow 909, also the virtual object 904 moves away from the stereoscopic display 901 as indicated by arrow 910, and vice versa, i.e. if the user moves closer to the stereoscopic display 901 and, thus, decreases the distance to the stereoscopic display 901, the virtual object 904 moves closer to the stereoscopic display 901.

Figure 4:
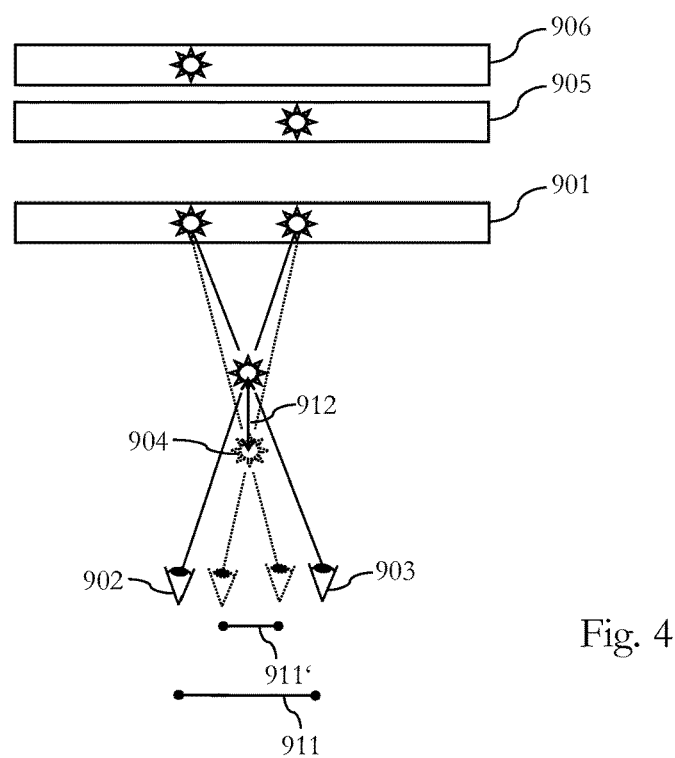
FIG. 4 schematically illustrates the object perception position of the displayed object perceived by the user when an eye distance of the user's eyes changes.
Figure 5:
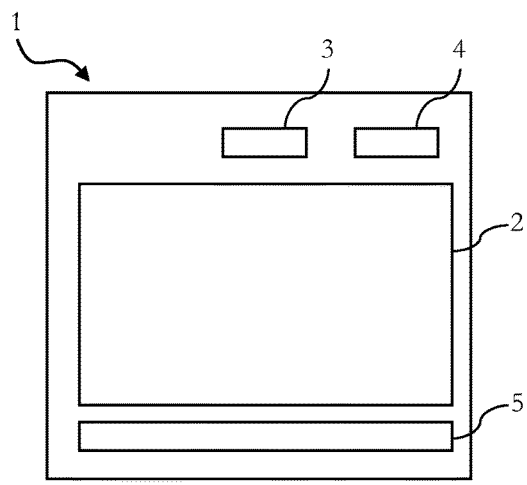
FIG. 5 schematically illustrates an embodiment of a three dimensional user interface displaying an object perceived by the user at a fixed object perception position.

Apart from the position of the user's eyes 902, 903 relative to the stereoscopic display 901, generally, there is a further quantity which can influence the perceived position of the object 904 in front of the stereoscopic display 901, as illustrated in FIG. 4. This quantity is the eye distance 911 (911') between the user's left eye 902 and right eye 903. The larger the user's eye distance 911, the closer the user perceives the virtual object 904 relative to the stereoscopic display 901 for a static left eye image 902 and a static right eye image 903 as indicated in FIG. 4 by arrow 912, and vice versa, i.e. the smaller the user's eye distance 911', the farer away the virtual object 904, i.e. closer to the stereoscopic display 901, is perceived by the user.

As mentioned above, in some embodiments, it is desired that such a virtual object is perceived at a static position by the user. Accordingly, in an embodiment an (electronic) apparatus comprises a processor which is adapted to provide a left eye image position for left eye image data and a right eye image position for right eye image data, wherein both can be adapted to the position of a user's left eye and a user's right eye. Some embodiments pertain to a respective method for controlling such an (electronic) apparatus.

The present disclosure is neither limited to a specific type of apparatus, nor to a specific type of processor or to a specific number of processors included in the apparatus. The apparatus can be an electronic device (portable device), such as a mobile phone, smartphone, laptop, personal computer, game console, electronic glasses which can be worn by a user in front of his eyes, electronic contact lenses, etc. The processor can include one or more processor cores and it can be implemented as a single processor or as a group of processors. The processors can be a microprocessor, a graphics processing unit, a combination thereof, etc.

The processor is configured to obtain image data representing an object for being displayed to a user, wherein the object is displayed on the basis of left eye image data and right eye image data obtained on the basis of the image data.

The processor may be connected to a device providing image data, such as a PC, a video game console or the like to obtain the image data, and/or it may be connected to a network, such as a local network and/or to the internet to receive the image data, and/or it may obtain the image data from a storage device, such as a universal serial bus stick, a hard disk, a compact disk, etc. The image data can be represented by raw image data or by compressed image data, such as JPEG, PNG, or the like. The image data can be received in a digital and/or analog form. The image data may comprise the left eye image data and the right eye image data and the processor may directly access the left eye image data and the right eye image data out of the image data for obtaining it. Alternatively, the processor may extract the left eye image data and the right eye image data from the image data to obtain it. The processor may also be configured to generate the left eye image data and/or the right eye image data on the basis of the image data, e.g. by duplicating the image data and thereby obtaining one copy for the left eye image data and one copy for the right eye image data. The image data can be or include three dimensional image data or stereoscopic image data which is adapted for being displayed on a stereoscopic display.

The processor is further configured to obtain user eye position data representing a left pupil position and a right pupil position of the user. The processor may be connected to a device providing user eye position data, such as a PC, a video game console or the like to obtain the user eye position data, and/or it may be connected to a network, such as a local network and/or to the internet to receive the user eye position data, and/or it may obtain the user eye position data from a storage device, such as a universal serial bus stick, a hard disk, a compact disk, etc. The user eye position data can be represented by raw image data or by compressed image data. The user eye position data can be received in a digital and/or analog form. The user eye position data may comprise the exact position of the user's left and right pupil and/or it may (indirectly) represent the position of user's left and right pupil. The processor may directly access the exact position of the user's left and right pupil from the user eye position data. Alternatively, the processor may extract the user eye position data, e.g. the exact position of the user's left and right pupil from a position information, e.g. from an image of the user provided e.g. in the form of image data to the processor.

The apparatus may include one or more interfaces for communication with external devices and/or networks and/or storages in order to obtain or receive the image data and/or the user eye position data.

The processor is further configured to generate a left eye image position for the left eye image data and a right eye image position for the right eye image data on the basis of the user eye position data. The left eye image position and the right eye image position may determine a position of the left eye image and the right eye image e.g. presented on a stereoscopic display or a display system provided with a display for each eye, e.g. glasses or (electronic) contacts (i.e. contact lenses). The left eye image position and the right eye image position may be adapted to the position of the user's left and right pupil obtained from the user eye position data. The apparatus can include the display(s) or display system in some embodiments, while in other embodiments the display(s) or display system is external to the apparatus.

The following description of embodiments pertains to the apparatus itself as well as to embodiments of methods, e.g. for controlling the apparatus. The methods can be carried out by the processor, in some embodiments.

In some embodiments the processor generates the left eye image position and the right eye image position such that the (virtual) object is perceived by the user at a fixed object perception position independent of the user's left pupil position and the user's right pupil position. Thus, if a left eye image based on the left eye image data is placed e.g. on the stereoscopic display at the left eye image position and a right eye image based on the right eye image data is placed on the stereoscopic display at the right eye image position, the user perceives the object at a fixed object perception position in front of the stereoscopic display independent of the position of the user or independent of the position of the user's pupils. The same result may be achieved if the left eye image is placed on a left eye display of the display system at the left eye image position and the right eye image is placed on a right eye display of the display system at the right eye image position. The fixed object perception position, at which the object is perceived may be a position determined in advance or a position, at which the user perceives the object, when the user switches the apparatus on. The fixed object perception position can be stored in a storage device and can be predefined, such that the object to be displayed to the user is perceived at a predefined fixed position with respect to a display displaying the object. The fixed object perception position can also be determined, for example, on the basis of a determination of a distance between the user's eyes and a display on which the object is to be displayed.

The user eye position data may be obtained repeatedly, e.g. periodically, or in real time and the processor may generate the left eye image position and the right eye image position according to the current user eye position data. Thus, the processor may react to changes in the position of the user's pupils such that the object is perceived by the user at a fixed position independent of the position of the user's pupils.

In some embodiments the user eye position data include at least one of distance information, view angle information and shift information of the left pupil position and the right pupil position, while in other embodiments at least one of distance information, view angle information and shift information can be determined on the basis of the user eye position data. The distance information may provide the distance between the user (user's eyes) and the fixed object perception position, at which the object is perceived, and/or between the user and the stereoscopic display or the display system. Additionally or alternatively, the distance information may include a distance between the eyes of the user (also referred to as "eye distance"), indicating the distance between the user's pupils. In the case that the user's eye distance increases, the processor may determine a left eye image position which is shifted with respect to a previous left eye image position away from a previous right eye image position and a right eye image position which is shifted with respect to the previous right eye image position away from the previous left eye image position.

The view angle information may provide information on the angle at which the user views the virtual object, e.g. whether the user focuses the object directly, whether the user views the object from the tail of his eyes, and/or whether the user is cross-eyed, etc.

The shift information may include information that the user has moved into a direction within a two-dimensional plane parallel to the stereoscopic display or to the display system. In this case the processor may determine a left eye image position which is shifted with respect to the previous left eye image position to a direction opposite to the direction the user has moved to, and a right eye image position which is shifted with respect to a previous right eye image position to the direction opposite to the direction the user has moved to. The shift information may additionally or alternatively include information that the user moves away from or approximates to the object perception position. In case that the user moves towards the object perception position, the processor may determine a left eye image position which is shifted with respect to the previous left eye image position in a direction away from the previous right eye image position and a right eye image position which is shifted with respect to a previous right eye image position in a direction away from the previous left eye image position.

In some embodiments the processor is configured to generate the left eye image position, which may be defined in three dimensions by the coordinates $x_{IL}$, $y_{IL}$ and $z_{IL}$, and the right eye image position, which may be defined in three dimensions by the coordinates $x_{IR}$, $y_{IR}$ and $z_{IR}$, on the basis of the following equations:

$$x_{IL}=x_O-z_O(x_{EL}-x_O)/(z_{EL}-z_O) \quad (I)$$

$$y_{IL}=y_O-z_O(y_{EL}-x_O)/(z_{EL}-z_O) \quad (II)$$

$$x_{IR}=x_O-z_O(x_{ER}-x_O)/(z_{ER}-z_O) \quad (III)$$

$$y_{IR}=y_O-z_O(y_{ER}-x_O)/(z_{ER}-z_O), \quad (IV)$$

In these equations (I) to (IV), the coordinates $x_O$, $y_O$ and $z_O$ define the object perception position of the object, the coordinates $x_{EL}$, $y_{EL}$ and $z_{EL}$ define the left pupil position and the coordinates $X_{ER}$, $y_{ER}$ and $z_{ER}$ define the right pupil position in a three dimensional space, such as a Cartesian coordinate system, without that the present disclosure is limited to a specific representation of a three dimensional space.

In some embodiments the apparatus further comprises a pupil position determiner for determining the left pupil position and the right pupil position and for generating user eye position data on the basis of the determined left pupil position and the determined right pupil position. The pupil position determiner may be formed integrally with the processor (apparatus) or it may be a separate component. The pupil position determiner may be or may include an eye tracking system configured to determine the position of the pupil for each eye relative to at least one of the object perception position of the object and the position of the stereoscopic display or the display system as well as a distance between the user' pupils. The pupil position determiner may include one or more (digital) cameras, wherein each camera takes a picture of at least the user's eyes, e.g. a picture of the user's head and/or a picture of the user, thereby generating user eye position data representing information about the position of the user's eyes. It may further include a pupil position determination unit for determining the position of the user's pupils from the picture(s) taken by each of the cameras, such that it could also generate the user eye position data including direct information about the position of the user's eyes. The camera(s) may be arranged in the vicinity of the stereoscopic display or the display system, e.g. in a plane in which at least one of the left eye image and the right eye image are presented. For example, the camera can be located at one edge of the display, e.g. at the upper or lower edge of the stereoscopic display or the display system. The pupil position determination unit may be a separate processor unit extern to the apparatus or the apparatus can include or this functionality can be implanted with the processor of the apparatus.

In some embodiments the apparatus further comprises a gesture determiner for detecting a gesture of the user. The gesture determiner may be a hand tracking system and/or a finger tracking system or the like. The gesture determiner may be implemented with at least one of the processor and the eye tracking system or it may be a separate component. The hand or finger tracking system may comprise one or more (digital) cameras each for taking a picture of at least one of the user's hands, e.g. a picture of the user and a hand or finger position determination unit for determining a position of a user's finger from the picture of each camera. Hence, the gesture determiner may generate gesture data representing a gesture made by the user. The hand or finger position determination unit may be further adapted to recognize a gesture, the user makes, and it may generate gesture data including direct information about a gesture made by the user. The hand or finger position determination unit may include a separate processor or it may be implemented with the processor of the apparatus. The camera(s) of the gesture determiner may be camera(s), which are arranged in addition to the camera (s) of the pupil position determiner e.g. in a plane of the stereoscopic display or the display system, where at least one of the left eye image and the right eye image are presented.

A common device comprising a (one) camera or a system of cameras, which e.g. takes a picture of the user's body including his head, and a determining unit for determining a pupil position and a hand or finger position from the picture can simultaneously serve as the pupil position determiner and the gesture determiner in some embodiments.

In some embodiments the processor is further configured to generate a feedback signal if the gesture of the user approaches to or overlaps with the fixed object perception position of the object. The feedback signal can be at least one of an optical signal, an acoustical signal and a tactile signal. For example, the optical feedback signal appears as at least one of a static or dynamic change of the object's colors being displayed, an addition of a chromatic halo around the object, which can be either static or dynamic, a vibration of the object's position, a static or dynamic change of the object's size, an overlay of the object with another object indicating a selection, a change of the object's underlying glyph statically or dynamically, which means the pictogram of the object is changing, a change of the extension of the object from 2D to 3D or vice versa or any other change in the appearance of the object or the image presented by the stereoscopic display or the display system.

The acoustical feedback signal can be at least one of a single beep, a repeating beep, a melody, wherein all objects can have the same melody, a certain melody, wherein each object can have its own melody, or any other acoustical signal.

The tactile signal may be a vibration of glasses forming the display system or a vibration of a remote control or the like.

In some embodiments the object includes at least one of an icon, a virtual keyboard, a virtual numeric keypad, a virtual key panel and/or any other virtual object to be handled by the user and/or which is suitable for being used as a graphical interface.

In some embodiments the apparatus further comprises a display for displaying the left eye image data at the left eye image position and the right eye image data at the right eye image position. The display may be a common stereoscopic display, e.g. an autostereoscopic display, a multi-view display, a light-field display, a holographic display or any other kind of display for displaying three-dimensional objects. Alternatively, the display may be a display system such as a stereo-display employing glasses or contacts. The display may be or may include a LCD, TFT, OLED, LED or any other type of display or display mechanism.

The apparatus may serve and/or may be implemented as three dimensional (graphical) user interface.

The three dimensional user interface is for example used in the field of gaming, for controlling the apparatus, e.g. for playing videos, music, etc., for controlling a movement of a machine, for controlling any other function of the apparatus or it may be used for any other functionality which is suitable for being controlled.

By manipulating artificial three-dimensional objects perceived in front of the stereoscopic display via a natural human-eye-hand coordination, e.g. a gamer can be effectively involved in virtual worlds. The gamer can feel somehow integrated into the game as he interacts not by game controllers or joysticks anymore as is known, but instead he uses his hands in a virtual three dimensional world. An example for a game is bringing balloons to burst by kicking them with the finger. The player with most burst balloons in a given time is the winner.

The three dimensional user interface may also be implemented to provide a virtual augmented keyboard as object to be displayed. The virtual augmented keyboard can be projected for example in a lower third of a three-dimensional display and can be used for entering data. As it is a virtual keyboard it can be adapted to any languages without the need for hardware changes. Furthermore, a user can configure and rearrange keys according to his personal preferences or working requests. As the virtual keyboard is perceived at a fixed position by the user in some embodiments, the user can interact with the virtual keyboard without having problems to hit single keys when moving his eyes.

The tree dimensional user interface can also be implemented in the field of cash machines, e.g. as virtual numeric keypad. Conventional cash machines contain two devices for interacting, a display and a small keyboard containing numbers 0 to 9 which is to be touched for entering a personal pin. For safety reasons it is recommended to cover the keyboard with one's hand or by other means during entering the personal pin. As the individual keys of the virtual numeric keypad are only static and at the correct position for a customer being in front of the cash machine, other persons standing beside can perceive the keys at different positions and thus see from their perspectives a costumer entering a different pin. The implementation of the three dimensional interface in accordance with the present disclosure instead of the known two devices of the conventional cash machines may on one side increase the safety and on the other side improve the user friendliness.

The implementation of a virtual augmented keyboard provided by the three dimensional interface allows combining display and keyboard into a single device in some embodiments. The keyboard can be implemented as a kind of virtual keyboard object being displayed and with which a customer can interact. As the keyboard is a virtual object the arrangement of the keys can be varied in a random way from customer to customer, as also discussed above. This can complicate a systematic spying of pins as reported already for conventional cash machines.

Modern medical equipment can employ a display and some kind of key panel for interaction. The interaction of such known medical equipment typically requires a direct physical contact to the key panel with fingers. This increases the probability of spreading of infections in a medical environment like a hospital. Normally, by a proper cleaning of the key panel the spreading of bacteria or other pathogens can be suppressed. However, this is a time consuming process and requires depending on the equipment the usage of special cleaning methods and cleaning substances. Hence, in some embodiments the three dimensional user interface may be configured to display a virtual object at a fixed perception position, as discussed above, and it may be employed instead of a key panel to be touched, thereby circumventing a physical contact to a key panel or the like. Furthermore, no expensive cleaning procedures have to be applied, as the object to be displayed is only virtual and, thus, does not provide any real surface on which pathogens can find a hold. Moreover, for example, when using the three dimensional user interface in an operating room instead of a key panel the probability of transferring infections to a patient may be reduced.

Furthermore, a kind of interactive information screens become more and more common, e.g. in public buildings such as museums or the like. An interactive information screen can be implemented similar to a touch display where a user can, for example, retrieve information about exhibits or a turn-by-turn direction by interacting with a finger on the touch display. Also here, in some embodiments, three dimensional user interfaces may be used instead of such interactive information screens, such that users do not have to be in a direct physical contact any more to a physical present screen, whereby also spreading of infections may be reduced.

In some embodiments the three dimensional user interface is used with eyewear, such as glasses targeting to augmented reality. In such embodiments, the apparatus may include such glasses. In such embodiments, for each eye of the user an image is generated, i.e. a left eye image and a right eye image, as discussed above. The glasses (i.e. the apparatus) can include two projectors, one for the left and one for the right eye display of the glasses for overlapping the virtual reality with the real world which is perceived by the user when looking through the lenses of glasses. In this case a three dimensional user interface is achievable for the eyewear.

In some embodiments, contacts (contact lenses) are implemented as three dimensional user interface, i.e. in some embodiments the apparatus includes the contacts. In this case, the projectors discussed in connection with the glasses above may be omitted for virtual reality experiences. A transparent display can be integrated directly into the contacts which allow overlapping the real world with the virtual world, i.e. with an object as discussed above.

In some embodiments the apparatus further comprises an acceleration sensor for detecting a movement of the apparatus and/or of the user, e.g. wearing/holding the apparatus, wherein the apparatus is configured to display the image data representing the object to the user in response to a predetermined movement detected by the acceleration sensor. In embodiments where the apparatus comprises two displays, such as in embodiments where the apparatus comprises an eyewear such as glasses providing two projectors to display the left eye image and the right eye image an acceleration sensor may additionally be provided. In some embodiments, the functionality of the three dimensional user interface discussed above may be increased. For example, the user wearing such eyewear, e.g. glasses, would see the normal (real) world as long as the person is in movement. As soon as the user stands still, which is detected by the acceleration sensor, the three dimensional user interface appears, i.e. can be displayed on the glasses. The three dimensional user interface can also be displayed upon detection of a movement by the acceleration sensor, e.g. a rotation, of the user's head to the left or right (or up or down, or shaking, or the like). As long as the user is looking into a predefined direction (which can be detected as discussed above), the three dimensional user interface is displayed and can be seen by the user. If the user turns the head back to a predefined "normal" position, the user interface may disappear. The display of the three dimensional user interface can also be terminated after elapse of a predetermined time interval, upon detection of a further predefined movement, e.g. head banging or the like.

Although the above description substantially pertained to a processor which is configured to perform the features described, as mentioned, the present disclosure is not limited in that regard, but these features can also be implemented in a method.

In some embodiments, also a non-transitory computer-readable recording medium is provided that stores therein a computer program product, which, when executed by a processor, such as the processor described above, causes the methods described herein to be performed.

Referring to FIGS. 5 and 6a to 6c, they illustrate an embodiment of an electronic apparatus in the form of a three dimensional user interface 1.

Figure 6A:
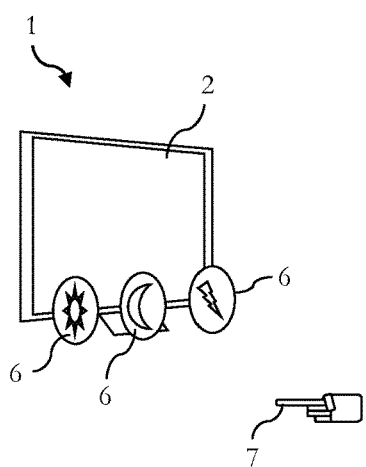
FIG. 6a, 6b, 6c schematically illustrate the three dimensional user interface of FIG. 5 in different states.
Figure 6B:
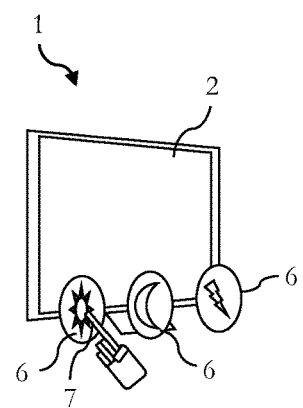
Figure 6C:
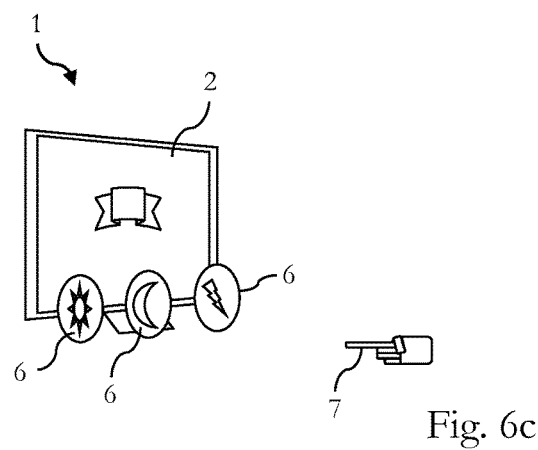

The three dimensional (graphical) user interface 1 comprises a stereoscopic LCD display 2, an eye tracking system 3, a finger tracking system 4 and a processor (processing unit) 5. The three dimensional stereoscopic user interface 1 is adapted to impose to a user the impression that three virtual icons 6 representing a (virtual) object as discussed above are levitating in front of the stereoscopic display 2. By moving a user's finger 7 e.g. to the position of the most left one of the icons 6 (FIG. 6b), an operation system of the interface 1 can be started. The interaction itself is feed backed to the user by changing the appearance of a content displayed by the stereoscopic display 2 (FIG. 6c).

Figure 8:
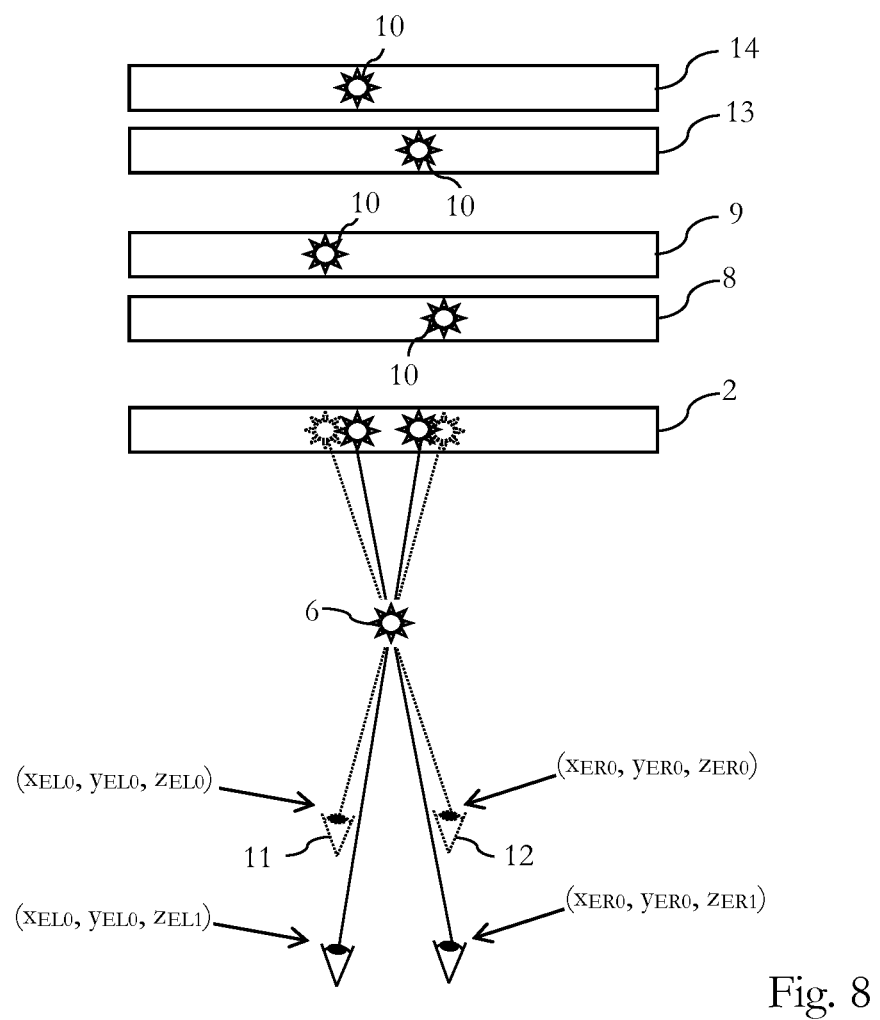
FIG. 8 schematically illustrates the left and right eye image position and the fixed object perception position of the displayed object according to an embodiment, when the user moves away from the displaying plane.
Figure 9:
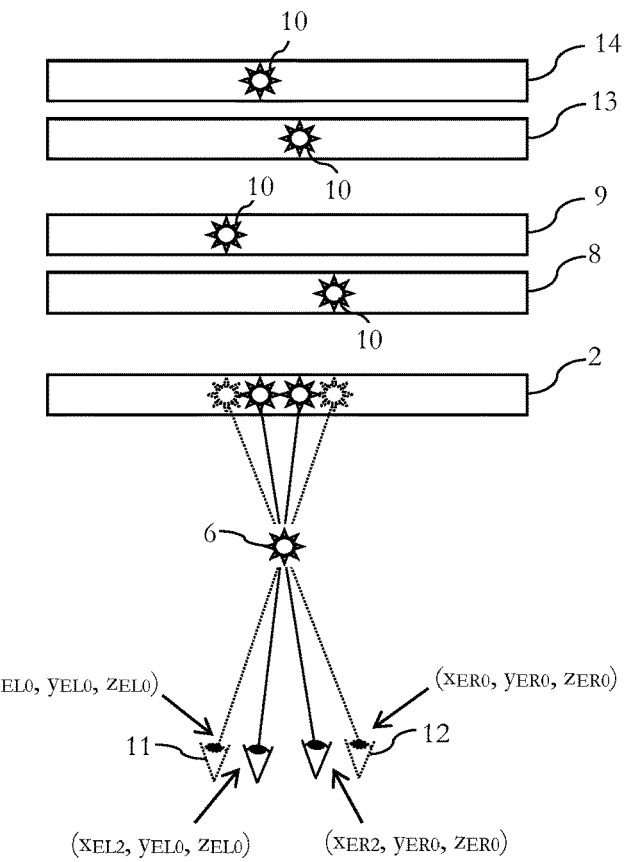
FIG. 9 schematically illustrates the left and right eye image position and the fixed object perception position of the displayed object according to an embodiment, when the user's eye distance changes.

As illustrated by FIGS. 7 to 9, the stereoscopic display 2 requires a left eye image 8 and a right eye image 9 both representing a picture 10 of the icon 6, to achieve a three dimensional perception by the user. The icon 6 appears static in its position in front of the stereoscopic display 2 by modifying the left eye image 8 and right eye image 9 in dependence of the user's position relative to the icon 6 and the stereoscopic display 2, as also discussed above, thereby compensating the movement of the user's eyes 11 and 12 such that the icon 6 is displayed at its fixed position.

FIGS. 7 to 9 illustrate that the stereoscopic display 2 presents the left eye image 8 and the right eye image 9, when the left eye 11 is located at a position $x_{EL0}$, $y_{EL0}$ and $z_{EL0}$ and the right eye 12 is located at a position $x_{ER0}$, $y_{ER0}$ and $z_{ER0}$. If the left eye 11 is moved in a plane parallel to a displaying plane of the stereoscopic display 2 to the right to the position $x_{EL1}$, $y_{EL0}$ and $z_{EL0}$ and the right eye 12 is moved in a plane parallel to the displaying plane of the stereoscopic display to the right to a position $x_{ER1}$, $y_{ER0}$ and $z_{ER0}$ as illustrated by FIG. 7, the stereoscopic display 2 presents an adapted left eye image 13 and an adapted right eye image 14 in order to hold the icon 6 at a fixed position. In the adapted left eye image 13 and the adapted right eye image 14 the position of the picture 10 of the icon 6 is shifted to the left, thereby compensating the movement of the user's eyes 11 and 12 such that the icon 6 is displayed at its fixed position.

If the left eye 11 and the right eye 12 are instead moved away from the display to the positions $x_{EL0}$, $y_{EL0}$ and $z_{EL1}$ and $X_{ER0}$, $y_{ER0}$ and $z_{ER1}$ as illustrated in FIG. 8, thereby increasing the distance between the eyes 11, 12 and the stereoscopic display 2, the stereoscopic display 2 presents the adapted left eye image 13 and the adapted right eye image 14, such that also in this case the icon 6 stays at its position. In the adapted left eye image 13 the position of the picture 10 of the icon 6 is shifted to the left in FIG. 8 and in the adapted right eye image 14 the position of the picture 10 of the icon 6 is shifted to the right so that a distance between the position of the picture 10 in the adapted left eye image 13 and the adapted right eye image 14 is reduced compared to that in the left eye image 8 and the right eye image 9, thereby compensating the movement of the user's eyes 11 and 12 such that the icon 6 is displayed at its fixed position.

If an eye distance of the user is reduced and the left eye 11 and the right eye 12 are at the positions $x_{EL2}$, $y_{EL0}$ and $z_{EL0}$ and $x_{ER2}$, $y_{ER0}$ and $z_{ER0}$ as illustrated in FIG. 9, the stereoscopic display 2 presents the adapted left eye image 13 and the adapted right eye image 14. In the adapted left eye image 13 the position of the picture 10 of the icon 6 is shifted to the left and in the right eye image 14 the position of the picture 10 of the icon 6 is shifted to the right in FIG. 9 and a distance between the position of the picture 10 in the adapted left eye image 13 and the picture 10 in the adapted right eye image 14 is reduced compared to that in the left eye image 8 and the right eye image 9, thereby compensating the movement of the user's eyes 11 and 12 such that the icon 6 is displayed at its fixed position.

Figure 10:
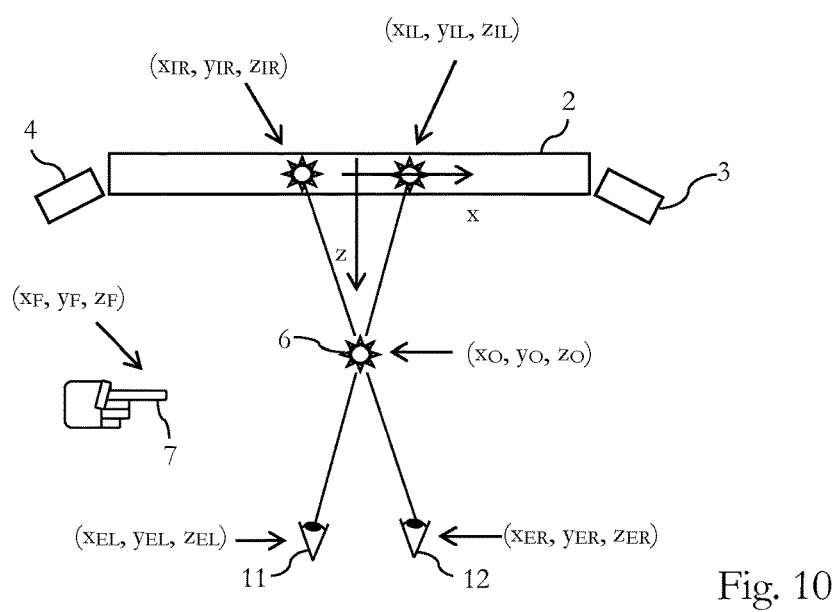
FIG. 10 schematically illustrates a basis for determining the left and right eye image position according to an embodiment.
Figure 11:
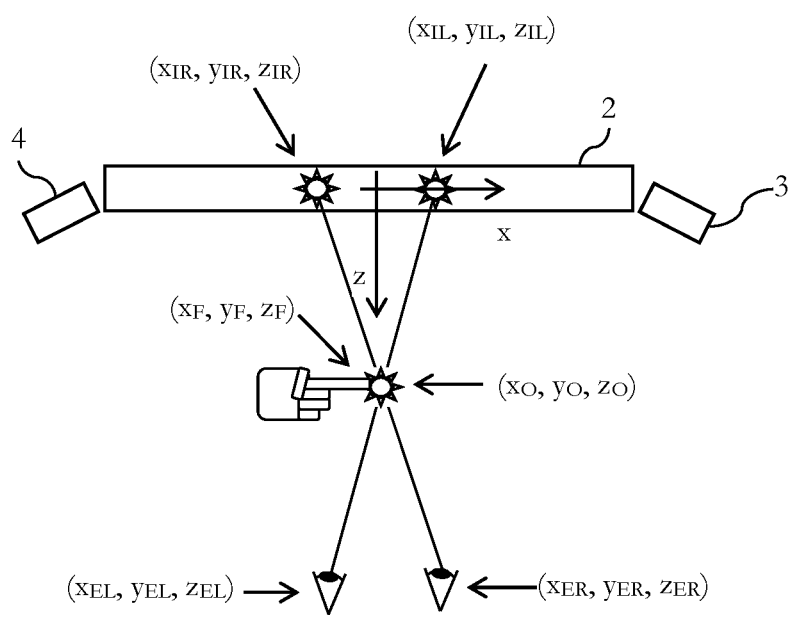
FIG. 11 schematically illustrates a basis for detecting an interaction of the user with the three dimensional user interface according to an embodiment.
Figure 12:
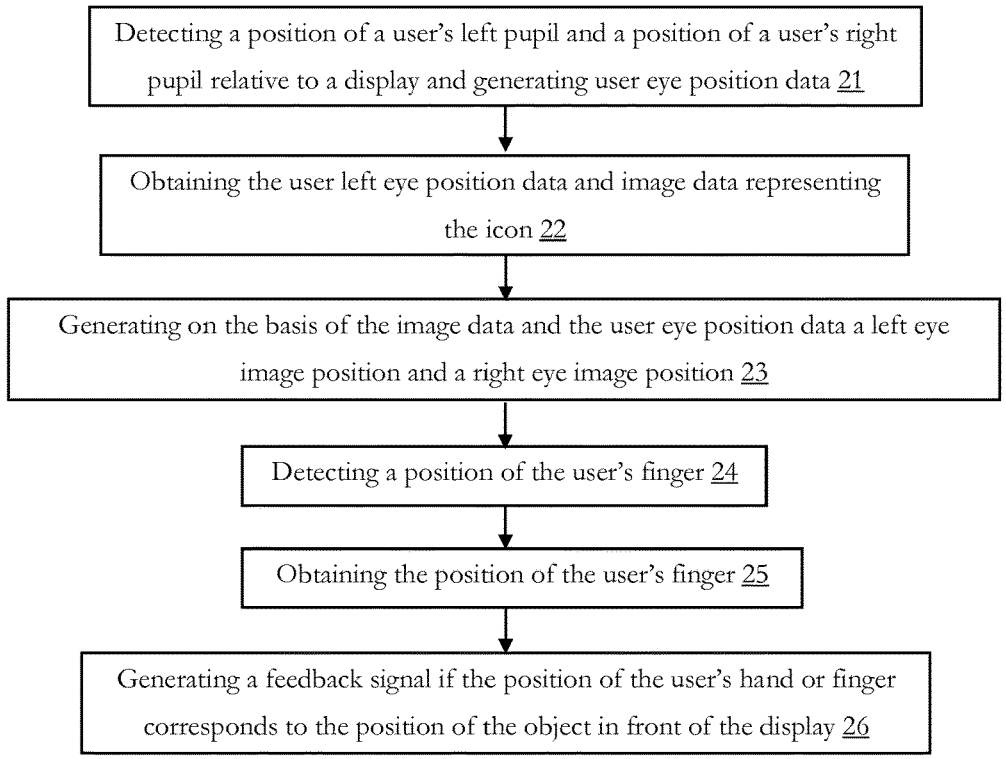
FIG. 12 illustrates a flow chart of an embodiment of a method for controlling the three dimensional user interface of FIG. 5.

With reference to FIGS. 10 to 12, a method 20 for determining the adapted left eye image 13 and the adapted right eye image 14 is explained, which can be performed by the user interface 1.

At 21 the eye tracking system 3 determines a left pupil position $x_{EL}$, $y_{EL}$ and $z_{EL}$ of the left eye 11 and a right pupil position $x_{ER}$, $y_{ER}$ and $z_{ER}$ of the right eye 12 and provides the left pupil position $x_{EL}$, $y_{EL}$ and $z_{EL}$ and the right pupil position $x_{ER}$, $y_{ER}$ and $z_{ER}$ as user eye position data to the processor 5. The eye tracking system 3 determines the left and right pupil position periodically by taking pictures of the user with a digital camera included in the eye tracking system 3. From this pictures, the eye tracking system 3 determines the left and right pupil position and generates respective user eye position data which is fed to the processor 5.

At 22 the processor 5 obtains image data representing the icon 6 including right eye image information and left eye image information and it obtains the user eye position data generated by the eye tracking system 3.

At 23 the processor 5 generates on the basis of the image data and the user eye position data a left eye image position $x_{IL}$, $y_{IL}$ and $z_{IL}$ at which the picture 10 of the icon 6 shall be presented in the right eye image and a right eye image position $x_{IR}$, $y_{IR}$ and $z_{IR}$ at which the picture 10 of the icon 6 shall be presented in the right eye image so that the user has the impression that the icon 6 is located at the object perception position $x_O$, $y_O$, $z_O$.

In the discussion of FIGS. 7 to 9 it was shown that there are mainly two quantities which determine the object perception position of the icon 6 by a user located in front of a stereoscopic display 2. First, this is the position of the eyes (such as eyes 11 and 12) relative to the icon (such as icon 6, i.e. the virtual object to be displayed) or the stereoscopic display 2 and second the eye distance (such as eye distance 911 or 911' as illustrated in FIG. 4 and as discussed above). These dependencies can be described mathematically by introducing a global coordinate system which is located in a center of the three dimensional display as presented in FIG. 10.

In some embodiments, an issue of the interaction with the three dimensional user interface 1 is the eye-hand coordination which might require a static position $x_O$, $y_O$ and $z_O$ of the icon 6 in front of the stereoscopic display 2, which might be predefined in some embodiments. This is achieved by a "dynamic" left eye image, wherein the position of the picture 10 if the icon 6 is given by $x_{IL}$, $y_{IL}$ and $z_{IL}$ and a "dynamic" right eye image, wherein the position of the picture 10 of the icon 6 is given by $x_{IR}$, $y_{IR}$ and $z_{IR}$. As the left pupil position $x_{EL}$, $y_{EL}$ and $z_{EL}$ and the right pupil position $x_{ER}$, $y_{ER}$ and $z_{ER}$ are obtained from the eye tracking system 3 and the object perception position $x_O$, $y_O$ and $z_O$ is fixed, and, thus, does not change, the processor 5 calculates the position $x_{IL}$, $y_{IL}$ and $z_{IL}$ for the left eye image 13 and the position $x_{IR}$, $y_{IR}$ and $z_{IR}$ for the right eye image 14 on the basis of the following equations:

$$x_{IL}=x_O-z_O(x_{EL}-x_O)/(z_{EL}-z_O) \quad (I)$$

$$y_{IL}=y_O-z_O(y_{EL}-x_O)/(z_{EL}-z_O) \quad (II)$$

$$x_{IR}=x_O-z_O(x_{ER}-x_O)/(z_{ER}-z_O) \quad (III)$$

$$y_{IR}=y_O-z_O(y_{ER}-x_O)/(z_{ER}-z_O), \quad (IV)$$

As the picture 10 of the icon 6 within the left eye image and the picture 10 of the icon 6 within the right eye image are located directly in the plane of the stereoscopic display 2, their z-coordinates are zero.

The left eye image 13 and the right eye image 14 are accordingly displayed at the positions $x_{IL}$, $y_{IL}$ and $z_{IL}$ and $x_{IR}$, $y_{IR}$ and $z_{IR}$, respectively, on the stereoscopic display 2.

At 24 the finger tracking system 4 determines a finger position $x_F$, $y_F$ and $z_F$ of a user's forefinger 7 and provides the finger position $x_F$, $y_F$ and $z_F$ to the processor 5 in the form of gesture data generated by the finger tracking system 4. The finger tracking system 4 includes a digital camera and it periodically takes pictures on the basis of which it determines gestures made by the user. Upon detection of a gesture, the finger tracking system 4 generates respective gesture data representing a finger position $x_F$, $y_F$ and $z_F$ and feeds it to the processor 5.

At 25 the processor 5 further obtains the finger position $x_F$, $y_F$ and $z_F$ from the finger tracking system 4. In the case that a finger 7 is detected in the vicinity of the icon 6, as presented by FIG. 11, which is the case when the finger position $x_F$, $y_F$ and $z_F$ of the finger 7 and the object perception position $x_O$, $y_O$ and $z_O$ overlapp, a feedback signal is generated and provided to the user at 26. The feeback signal is a change of the appearance of the icon 6 or the content displayed by the stereoscopic display 2 as indicated by FIG. 6c, without limiting the present disclosure in that regard.

Figure 13:
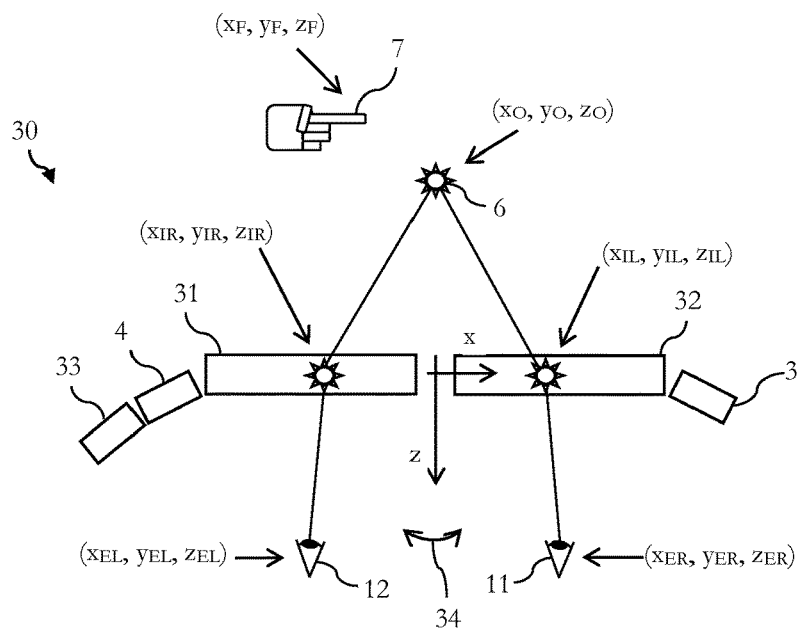
FIG. 13 schematically illustrates another embodiment of a three dimensional user interface.

FIG. 13 illustrates another embodiment of the apparatus in the form of glasses 30 targeting to augmented reality providing a three dimensional user interface.

The glasses 30 include a left eye display 31 for presenting a left eye image to the user and a right eye display 32 for presenting a right eye image to the user. Furthermore, the glasses 30 include an eye tracking system 3, a finger tracking system 4 and a processor (not shown), which are similar to those already described with respect to FIGS. 5 to 12.

The left pupil position $x_{EL}$, $y_{EL}$ and $z_{EL}$ and the right pupil position $X_{ER}$, $y_{ER}$ and $z_{ER}$ are detected by the eye tracking system 3 and provided to the processor as user eye position data. The processor determines on the basis of the user eye position data and the object perception position $x_O$, $y_O$ and $z_O$, which is static, the left eye image position $x_{IL}$, $y_{IL}$ and $z_{IL}$ and the right eye image position $x_{IR}$, $y_{IR}$ and $z_{IR}$, at which the picture 10 of the icon 6 has to be presented on the left eye display 31 and the right eye display 32. For the determination of the left eye image position $x_{IL}$, $y_{IL}$ and $z_{IL}$ and the right eye image position $x_{IR}$, $y_{IR}$ and $z_{IR}$ the equations (I) to (IV) are used, as discussed above.

The glasses 30 further comprise an acceleration sensor 33 which detects a movement of the glasses 30 and, thus, also a movement of a user wearing the glasses. The left eye image and the right eye image representing the icon 6 are only displayed, when the acceleration sensor 33 detects a predefined movement and/or predefined position. If, for example, the user turns the head to the right (or left), as indicated by the arrow 34, the acceleration sensor 33 detects the motion of the user's head, and, thus, of the glasses 30, and feeds a respective motion signal to the processor. Upon detection of a predefined movement in the motion signal received from the acceleration sensor 33, the processor controls the left eye display 31 and the right eye display 32 accordingly to display the left and right eye image, respectively, such that the user perceives the icon 6 and can, e.g. as discussed above, interact with the icon 6. As soon as the acceleration sensor 33 detects a motion back, for example in the previous position of the user's head before the movement was detected, the left and right eye image representing the icon 6 are fade out and the user sees the real world through glasses 30 without the icon 6 being displayed.

Note that the present technology can also be configured as described below.

(1) An apparatus including a processor configured to
obtain image data representing an object for being displayed to a user, wherein the object is displayed on the basis of left eye image data and right eye image data obtained on the basis of the image data;
obtain user eye position data representing a left pupil position and a right pupil position of the user; and
generate a left eye image position for the left eye image data and a right eye image position for the right eye image data on the basis of the user eye position data.

(2) The apparatus according to (1), wherein the left eye image position and the right eye image position are such generated that the object is perceived by the user at a fixed object perception position independent of the user's left pupil position and the user's right pupil position.

(3) The apparatus according to (1) or (2), wherein the user eye position data include at least one of distance information, view angle information and shift information of the left pupil position and the right pupil position.

(4) The apparatus according to anyone of (1) to (3), wherein the processor is configured to generate the left eye image position and the right eye image position on the basis of the following equations:

$$x_{IL}=x_O-z_O(x_{EL}-x_O)/(z_{EL}-z_O)$$

$$y_{IL}=y_O-z_O(y_{EL}-x_O)/(z_{EL}-z_O)$$

$$x_{IR}=x_O-z_O(x_{ER}-x_O)/(z_{ER}-z_O)$$

$$y_{IR}=y_O-z_O(y_{ER}-x_O)/(z_{ER}-z_O),$$

wherein in three dimensions an object perception position of the object is defined by the coordinates $x_O$, $y_O$ and $z_O$, the left pupil position by the coordinates $x_{EL}$, $y_{EL}$ and $z_{EL}$, the right pupil position by the coordinates $x_{ER}$, $y_{ER}$ and $z_{ER}$, the left eye image position by the coordinates $x_{IL}$, $y_{IL}$ and $z_{IL}$, and the right eye image position by the coordinates $x_{IR}$, $y_{IR}$ and $z_{IR}$.

(5) The apparatus according to anyone of (1) to (4), further including a pupil position determiner for determining the left pupil position and the right pupil position and for generating the user eye position data on the basis of the determined left pupil position and the determined right pupil position.

(6) The apparatus according to anyone of (1) to (5), further including a gesture determiner for detecting a gesture of the user.

(7) The apparatus according to (6), wherein the processor is further configured to generate a feedback signal if the gesture of the user approaches to or overlaps with the fixed object perception position of the object.

(8) The apparatus according to anyone of (1) to (7), wherein the object includes at least one of an icon, a virtual keyboard, a virtual numeric keypad, a virtual key panel and any other virtual object to be handled by the user.

(9) The apparatus according to anyone of (1) to (8), further including a display for displaying the left eye image data at the left eye image position and the right eye image data at the right eye image position.

(10) The apparatus according to anyone of (1) to (9), further including an acceleration sensor for detecting a movement of the apparatus, wherein the apparatus is further configured to display the image data representing the object to the user in response to a predetermined movement is detected by the acceleration sensor.

(11) A method including:
obtaining image data representing an object for being displayed to a user, wherein the object is displayed on the basis of left eye image data and right eye image data obtained on the basis of the image data;
obtaining user eye position data representing a left pupil position and a right pupil position of the user; and
generating a left eye image position for the left eye image data and a right eye image position for the right eye image data on the basis of the user eye position data.

(12) The method according to (11), wherein the left eye image position and the right eye image position are such generated that the object is perceived by the user at a fixed object perception position independent of the user's left pupil position and the user's right pupil position.

(13) The method according to (11) or (12), wherein the user eye position data include at least one of a distance information, view angle information and a shift information.

(14) The method according to anyone of (11) to (13), wherein the left eye image position and the right eye image position are generated on the basis of the following equations:

$$x_{IL}=x_O-z_O(x_{EL}-x_O)/(z_{EL}-z_O)$$

$$y_{IL}=y_O-z_O(y_{EL}-x_O)/(z_{EL}-z_O)$$

$$x_{IR}=x_O-z_O(x_{ER}-x_O)/(z_{ER}-z_O)$$

$$y_{IR}=y_O-z_O(y_{ER}-x_O)/(z_{ER}-z_O),$$

wherein in three dimensions an object perception position of the object is defined by the coordinates $x_O$, $y_O$ and $z_O$, the left pupil position by the coordinates $x_{EL}$, $y_{EL}$ and $z_{EL}$, the right pupil position by the coordinates $x_{ER}$, $y_{ER}$ and $z_{ER}$, the left eye image position by the coordinates $x_{IL}$, $y_{IL}$ and $z_{IL}$, and the right eye image position by the coordinates $x_{IR}$, $y_{IR}$ and $z_{IR}$.

(15) The method according to anyone of (11) to (14), wherein the left pupil position and the right pupil position are determined and the user eye position data is generated on the basis of the determined left pupil position and the determined right pupil position.

(16) The method according to anyone of (11) to (15), further including detecting a gesture of the user.

(17) The method according to (16), further including generating a feedback signal if the gesture of the user approaches to or overlaps with the fixed object perception position of the object.

(18) The method according to anyone of (11) to (17), wherein the object includes at least one of an icon, a virtual keyboard, a virtual numeric keypad, a virtual key panel and any other virtual object to be handled by the user.

(19) The method according to anyone of (11) to (18), further including displaying the left eye image data at the left eye image position and the right eye image data at the right eye image position.

(20) The method according to anyone of (11) to (19), further comprising detecting a movement of the user and displaying the image data representing the object to the user in response to a detected predetermined movement of the user.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. An apparatus comprising a processor configured to:
obtain image data representing an object, which object is displayed to a user at an object perception position in front of a three-dimensional display, wherein the object is displayed on the basis of left eye image data and right eye image data on the three-dimensional display, each of the left eye image data and the right eye image data including the image data representing the object;
obtain user eye position data representing a left pupil position and a right pupil position of the user; and
generate a left eye image position for the left eye image data and a right eye image position for the right eye image data on the basis of the user eye position data and the perception position of the object.

2. The apparatus according to claim 1, wherein
the left eye image position and the right eye image position are such generated so that the object is perceived by the user at a fixed object perception position independent of the user's left pupil position and the user's right pupil position.

3. The apparatus according to claim 1, wherein
the user eye position data include at least one of distance information, view angle information and shift information of the left pupil position and the right pupil position.

4. The apparatus according to claim 1, wherein
the processor is configured to generate the left eye image position and the right eye image position on the basis of the following equations:

$$x_{IL}=x_O-z_O(x_{EL}-x_O)/(z_{EL}-z_O)$$

$$y_{IL}=y_O-z_O(y_{EL}-x_O)/(z_{EL}-z_O)$$

$$x_{IR}=x_O-z_O(x_{ER}-x_O)/(z_{ER}-z_O)$$

$$y_{IR}=y_O-z_O(y_{ER}-x_O)/(z_{ER}-z_O),$$

wherein in three dimensions an object perception position of the object is defined by the coordinates $x_O$, $y_O$ and $z_O$, the left pupil position by the coordinates $x_{EL}$, $y_{EL}$ and $z_{EL}$, the right pupil position by the coordinates $x_{ER}$, $y_{ER}$ and $z_{ER}$, the left eye image position by the coordinates $x_{IL}$, $y_{IL}$, and $Z_{IL}$, and the right eye image position by the coordinates $x_{IR}$, $y_{IR}$ and $z_{IR}$.

5. The apparatus according to claim 1, wherein
the processor is further configured to perform determining the left pupil position and the right pupil position and generating the user eye position data on the basis of the determined left pupil position and the determined right pupil position.

6. The apparatus according to claim 1, wherein
the processor is further configured to perform gesture determination for detecting a gesture of the user.

7. The apparatus according to claim 6, wherein
the processor is further configured to generate a feedback signal if the gesture of the user approaches to or overlaps with the fixed object perception position of the object.

8. The apparatus according to claim 1, wherein
the object includes at least one of an icon, a virtual keyboard, a virtual numeric keypad, a virtual key panel and any other virtual object to be handled by the user.

9. The apparatus according to claim 1, further comprising a display for displaying the left eye image data at the left eye image position and the right eye image data at the right eye image position.

10. The apparatus according to claim 1, further comprising an acceleration sensor for detecting a movement of the apparatus, wherein the apparatus is further configured to display the image data representing the object to the user in response to a predetermined movement detected by the acceleration sensor.

11. A method comprising:
obtaining image data representing an object, which object is displayed to a user at an object perception position in front of a three-dimensional display, wherein the object is displayed on the basis of left eye image data and right eye image data on the three-dimensional display, each of the left eye image data and the right eye image data including the image data representing the object;
obtaining user eye position data representing a left pupil position and a right pupil position of the user; and
generating a left eye image position for the left eye image data and a right eye image position for the right eye image data on the basis of the user eye position data and the perception position of the object.

12. The method according to claim 11, wherein
the left eye image position and the right eye image position are such generated so that the object is perceived by the user at a fixed object perception position independent of the user's left pupil position and the user's right pupil position.

13. The method according to claim 11, wherein
the user eye position data include at least one of a distance information, view angle information and a shift information.

14. The method according to claim 11, wherein
the left eye image position and the right eye image position are generated on the basis of the following equations:

$$x_{IL}=x_O-z_O(x_{EL}-x_O)/(z_{EL}-z_O)$$

$$y_{IL}=y_O-z_O(y_{EL}-x_O)/(z_{EL}-z_O)$$

$$x_{IR}=x_O-z_O(x_{ER}-x_O)/(z_{ER}-z_O)$$

$$y_{IR}=y_O-z_O(y_{ER}-x_O)/(z_{ER}-z_O),$$

wherein in three dimensions an object perception position of the object is defined by the coordinates $x_O$, $y_O$ and $z_O$, the left pupil position by the coordinates $x_{EL}$, $y_{EL}$ and $z_{EL}$, the right pupil position by the coordinates $x_{ER}$, $y_{ER}$ and $z_{ER}$, the left eye image position by the coordinates $x_{IL}$, $y_{IL}$, and $Z_{IL}$, and the right eye image position by the coordinates $x_{IR}$, $y_{IR}$ and $z_{IR}$.

15. The method according to claim 11, wherein
the left pupil position and the right pupil position are determined and the user eye position data is generated on the basis of the determined left pupil position and the determined right pupil position.

16. The method according to claim 11, further comprising detecting a gesture of the user.

17. The method according to claim 16, further comprising generating a feedback signal if the gesture of the user approaches to or overlaps with the fixed object perception position of the object.

18. The method according to claim 11, wherein
the object includes at least one of an icon, a virtual keyboard, a virtual numeric keypad, a virtual key panel and any other virtual object to be handled by the user.

19. The method according to claim 11, further comprising displaying the left eye image data at the left eye image position and the right eye image data at the right eye image position.

20. The method according to claim 11, further comprising detecting a movement of the user and displaying the image data representing the object to the user in response to a detected predetermined movement of the user.

* * * * *